United States Patent [19]
Carter

[11] 3,908,815
[45] Sept. 30, 1975

[54] SPEED CONTROL FOR LABELING MACHINES
[75] Inventor: Sidney T. Carter, Shrewsbury, Mass.
[73] Assignee: A-T-O Inc., Cleveland, Ohio
[22] Filed: Nov. 12, 1973
[21] Appl. No.: 414,816

[52] U.S. Cl. .................................. 198/37; 198/110
[51] Int. Cl.² ........................................ B65G 43/08
[58] Field of Search ......... 198/19, 37, 76, 110, 203;
74/242.11 R, 242.11 P, 242.11 C, 242.1 FP,
230.17 R, 230.17 A, 230.17 B, 242.8;
156/350, 351, 362, 363

[56] References Cited
UNITED STATES PATENTS

| | | | |
|---|---|---|---|
| 2,299,036 | 10/1942 | Rivers | 74/230.17 A |
| 2,437,540 | 3/1948 | Klaucke | 74/230.17 B |
| 2,543,967 | 3/1951 | Heyer | 74/242.15 R |
| 2,940,630 | 6/1960 | Carter | 156/351 |
| 3,194,081 | 7/1965 | Parsons et al. | 74/230.17 B |
| 3,607,547 | 9/1971 | Kronseder | 156/351 |

Primary Examiner—Evon C. Blunk
Assistant Examiner—Joseph E. Valenza
Attorney, Agent, or Firm—Robert T. Gammons

[57] ABSTRACT

In a labeling machine in which there is a main drive shaft with connections therefrom for driving a conveyor, label-applying turrets, label pickers, adhesive-applying rolls, pumps for supplying adhesive to the adhesive-applying rolls and wipers; a speed change mechanism for driving the main shaft at top speed and at low speed controlled by a detector which effects a change of speed upon detection of a gap of predetermined length or no containers, said speed change mechanism comprising an output pulley on the main drive shaft, a motor driven input pulley and intermediate pulleys connected to the output and input pulleys for transmitting rotation from one to the other, and wherein two of the pulleys embodied in the speed change mechanism are of variable diameter and so arranged that their effective driving diameters are simultaneously changed with an appropriate delay in response to operation of the detector.

34 Claims, 9 Drawing Figures

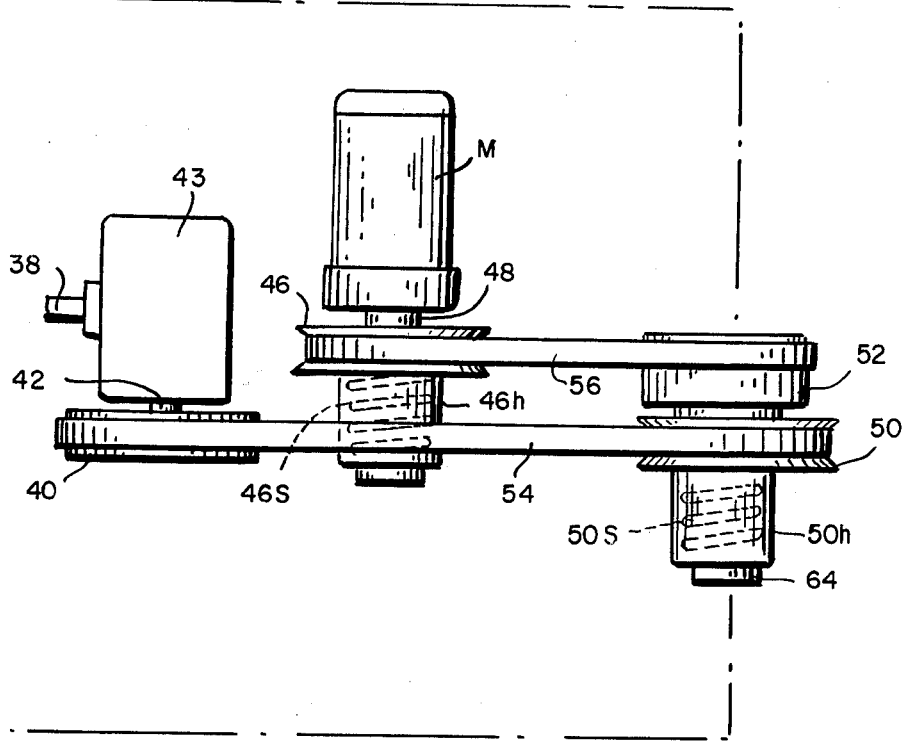
FIG.6
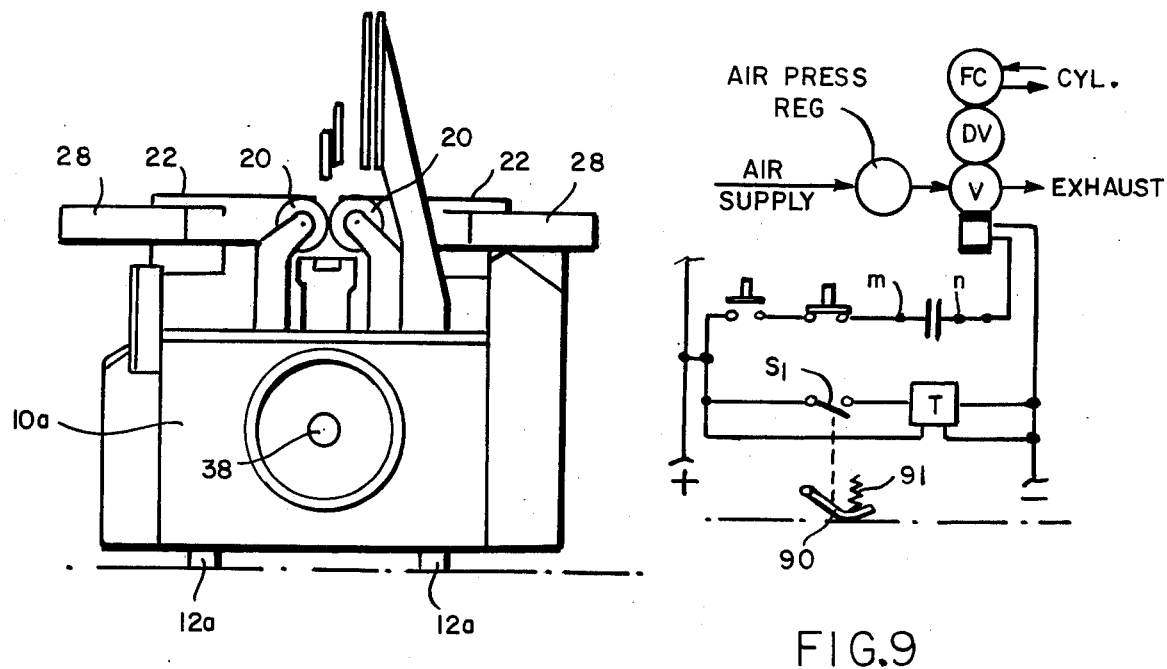
FIG.3
FIG.9

SPEED CONTROL FOR LABELING MACHINES

BACKGROUND OF THE INVENTION

In my U.S. Pat. Nos. 2,866,534 and 2,940,630, there are shown article handling apparatus, specifically apparatus for delivering containers successively to labeling instrumentalities, including, for example, feed screws, label pickers, adhesive appliers, wipers and the like and drive means for effecting operation of the aforesaid instrumentalities designed to effect operation at two different speeds, - high speed for normal operation and low speed for idling. The speed change is achieved by use of a variable diameter pulley fixed to the motor shaft and a fixed diameter pulley connected to the main drive shaft which transfers the power from the motor to the instrumentalities and by mounting the motor so that it may be moved relative to the fixed diameter pulley to change the distance between the pulleys. A speed ratio of approximately 3 to 1 can be had with the aforesaid arrangement. Current labeling apparatus as illustrated in my pending U.S. applications Ser. No. 346,125, filed Mar. 29, 1973, Ser. No. 337,579, filed Mar. 2, 1973, Ser. No. 315,795, filed Dec. 18, 1972 and Ser. No. 308,280, filed Nov. 20, 1972 now U.S. Pat. No. 3,806,114 operate at much higher speed than that shown in the aforesaid patents; hence the speed ratio afforded by the mechanism shown in the aforesaid patents is not adequate. It is the purpose of this invention to employ speed change mechanism similar to that shown in the aforesaid patents modified to provide for a much greater difference between the operating speed and the low or idling speed.

SUMMARY

As herein illustrated, the invention resides in speed change mechanism for use in conjunction with labeling machinery and particularly high speed labeling machinery and comprises in conjunction with the main drive shaft of such a machine a fixed diameter output pulley drivably connected to the main shaft, a motor driven variable diameter input pulley and intermediate pulleys belted thereto comprising a fixed diameter pulley and a variable diameter pulley belted, respectively, to the input and output pulleys, and means for effecting translational movement of the intermediate pulleys relative to the input and output pulleys. The several pulleys are arranged to rotate about spaced parallel axes with the input pulley situated between the output pulley and the intermediate pulleys and the belts entrained about the pulleys are of predetermined fixed length. There is means for effecting translational movement of the intermediate pulleys relative to the input and output pulleys and means for determining the extent of such movement. An arm pivotally supported at one end and to the other end of which the intermediate pulleys are mounted provides for the translational movement of the intermediate pulleys angularly about the pivoted end of the arm and angular movement is effected by a pneumatically operated piston and cylinder assembly connected to the arm. Pressure is supplied to the cylinder and exhausted from the cylinder in response to a detector mounted adjacent the conveyor on which the containers are moved through the machine to, on the one hand, effect high speed operation and, on the other hand, low speed operation. A circuit and valve means operable by the detector supplies pressure to the cylinder and exhausts it therefrom.

The invention will now be described in greater detail with reference to the accompanying drawings wherein:

FIG. 3 is an end elevation taken from the left end of FIG. 2;

FIG. 6 is a plan view of the speed change means;

Figure 1:
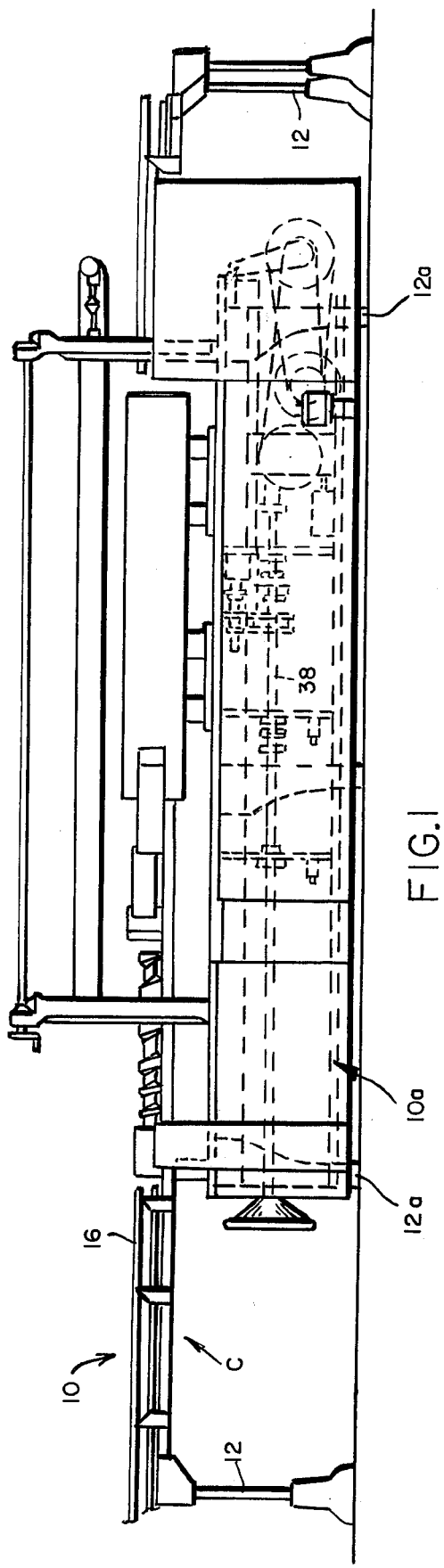
FIG. 1 is a side elevation of a bottle labeling apparatus for which the speed change drive means of this invention is especially designed.

FIG. 9 diagrammatically illustrates the part of the electrical circuit of the machine which controls the supply of pressure to the operating cylinder of the speed change drive means.

The speed change means of this invention is especially designed for use in conjunction with the label-applying apparatus which forms the subject matter of the aforesaid pending applications. In the aforesaid labeler the containers being processed are advanced at high speed by the infeed conveyor into the feed screws and if the leading container in a line of containers does not mesh with the spiral of the feed screws at the entrance thereto, it can become jammed and break. It is accordingly desirable to start the operation of the labeler at a relatively low speed, that is low enough so that the leading container in the line of containers being advanced toward the feed screws can find its way into the spiral of the screw without jamming or breaking. After the initial meshing of the leading container in the line of containers, the succeeding containers will flow naturally into the spiral of the screw and so the speed may be increased to high speed operation without danger. Also, if a gap occurs in the line of containers for any reason, for example, failure of the preceding apparatus to supply the containers fast enough to keep the labeler completely supplied, or by running the labeler at a higher speed than the preceding machine to prevent backup, or by stopping delivery of containers to the labeler, it is desirable to slow the machine down so that the first container in the line of containers to again reach the feed screws will be lead into the spiral of the screw without damage. A change from high speed to low speed is also desirable to effect economy in the operation of the labeler and, in particular, to reduce circulation of adhesive during idle periods. It is to be understood, however, that this same speed change means could be used on any other high speed container processing apparatus for the purpose of providing low speed operation without entirely stopping the apparatus when the delivery of containers to the apparatus ceases or there are gaps between containers or groups of containers.

Referring to the drawings (FIGS. 1, 2 and 3), there is shown a frame 10 supported at its ends by pedestals 12—12 on which is mounted a conveyor C which extends longitudinally of the frame. The conveyor comprises link chains to which there are fastened plates which form a horizontal supporting surface on which containers, specifically bottles, delivered thereto are moved lengthwise of the frame 10 standing in upright positions. The bottles are delivered to the conveyor C between spaced parallel guide rails 16—16 past a detector 18 located adjacent the conveyor which detects the presence or absence of bottles and/or gaps of predetermined length between successive groups of bottles. At opposite sides of the conveyor C there are successively arranged on a supporting base 10a resting on legs 12a—12a a pair of feed screws 20—20 which operate to spot bottles at a predetermined spacing, a pair of label-applying turrets 22—22 on which there are peripherally spaced label-applying pads for pressing labels carried by the pads into engagement with opposite sides of bottles travelling along with the conveyor between them, pairs of adhesive-applying rolls 24—24 for applying adhesive to the labels carried by the pads before the labels are moved into engagement with the bottles, the adhesive applying rolls being supplied with adhesive from glue reservoirs 26—26, label holders 28—28 and pickers 30—30 for removing labels from the label holders and applying them to the pads of turrets. Beyond the turrets in the direction of movement of the conveyor there are a first, second and third sets of wipers 32—32, 34, 34 and 36—36.

The base also supports in a horizontal position and extending longitudinally of the apparatus a main drive shaft (38) and from this drive shaft (38) there are suitable connections which drive the conveyor C, the feed screws 20—20, the turrets 22—22, the applicator rolls 24—24 and pumps (not shown) in the reservoirs 26—26 which supply adhesive to the applicator rolls, the pickers 30—30 and the successive wipers 32, 34 and 36.

Normally this apparatus operates at a very high speed and so long as bottles continue to be delivered in succession to the conveyor C and by the conveyor C to the feed screws it is desirable to maintain the operation at top speed. However, for starting up or when the supply of bottles is stopped for some reason such, for example, as when a particular lot of bottles has been completed or, for example, a gap develops between the bottles as when the bottles are not delivered fast enough it is desirable to operate the apparatus at a slow or idling speed until the leading bottle reaches and becomes meshed with the feed screws before operating at high speed to avoid jamming or breakage. Since there is a very wide range in the change of speed from top speed to slow or idling speed which cannot be provided for by the speed reduction mechanism shown in the aforesaid U.S. Pat. Nos. 2,866,534 and 2,940,630, a specially designed speed reduction means is employed for this apparatus, the construction and operation of which is shown generally in FIG. 1 and in detail in FIGS. 4, 5 and 6.

Figure 2:
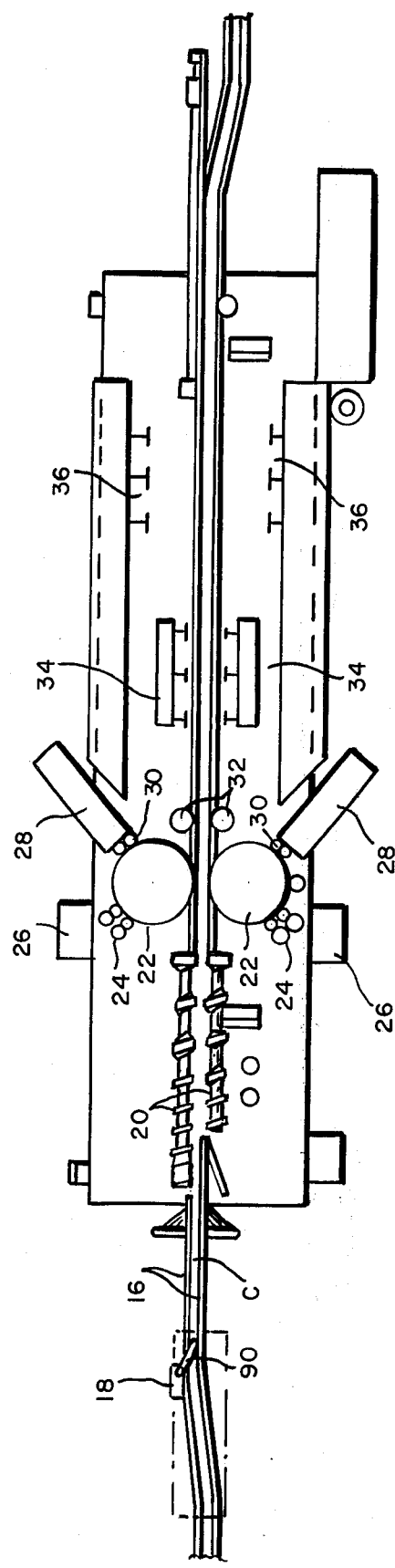
FIG. 2 is a plan view of FIG. 1.
Figure 4:
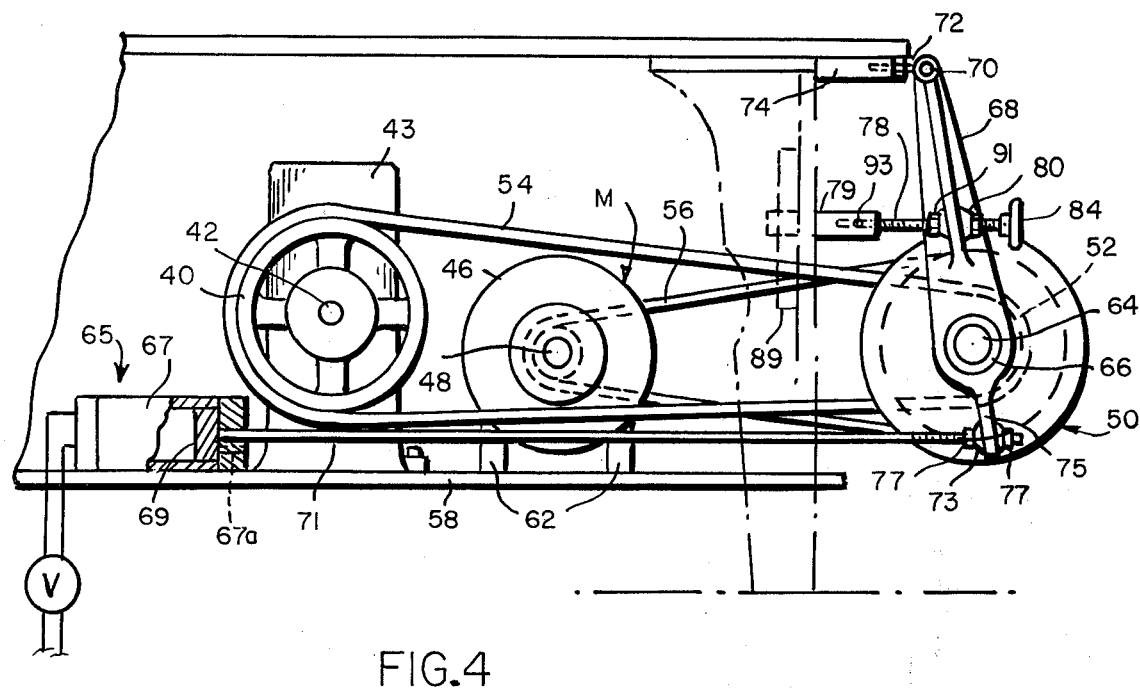
FIG. 4 is a fragmentary elevation to larger scale, with parts in section showing the speed change means in one position of operation.
Figure 5:
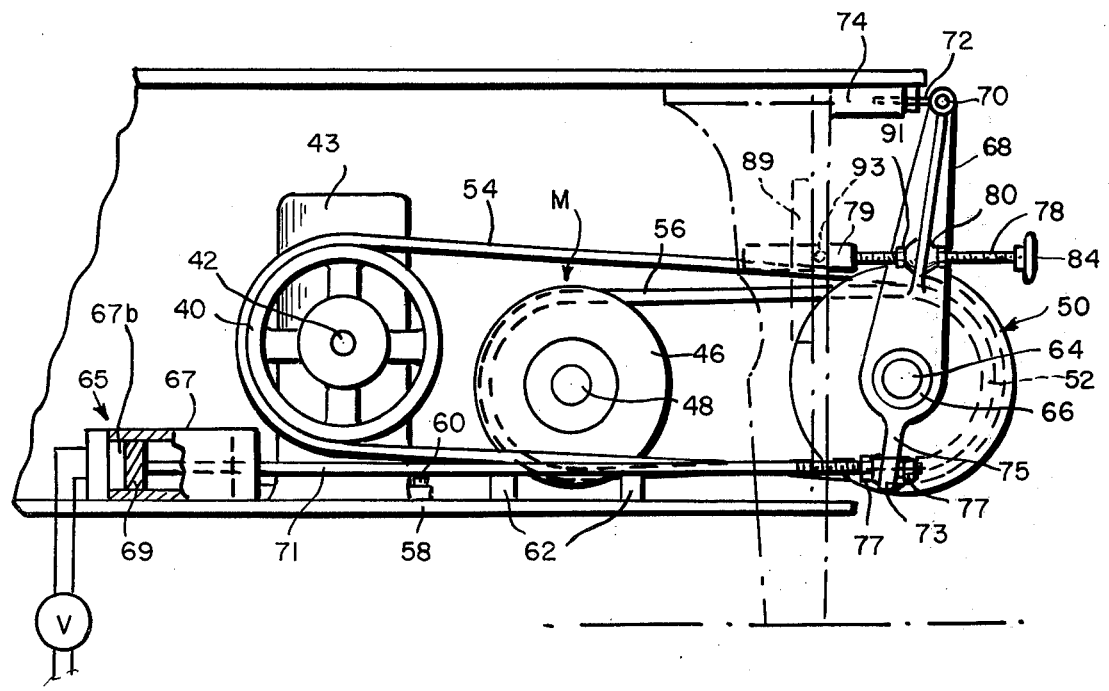
FIG. 5 is a similar view of the speed change means in another position with parts in section.
Figure 7:
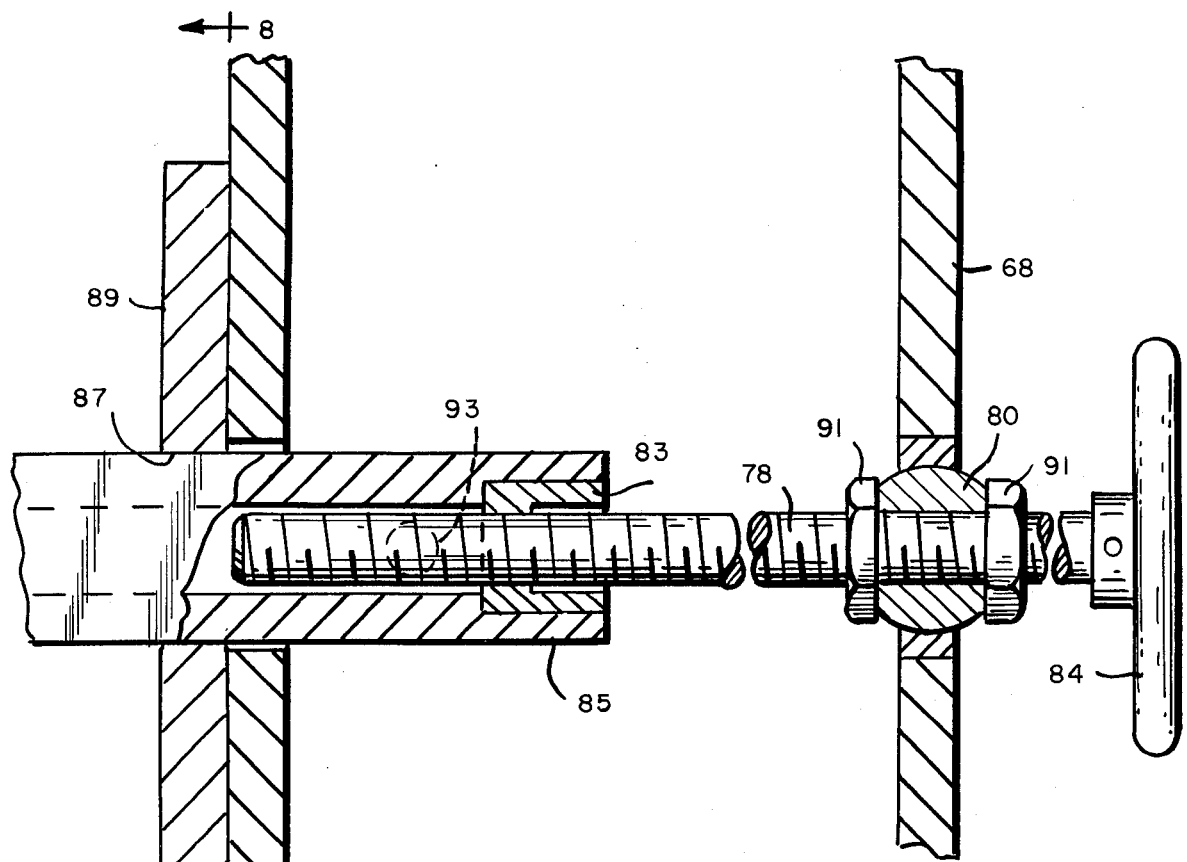
FIG. 7 is an enlarged view of the high speed adjustment.

The mechanism referred to and by means of which the main drive shaft 38 is adapted to be driven at a high speed or at a low or idling speed comprises (FIG. 6) a fixed diameter pulley 40 mounted on a shaft 42 of a gear reducer 43 to which the main drive shaft 38 is connected; a variable diameter pulley 46 fixed to the shaft 48 of the main drive motor M and intermediate pulleys 50 and 52 which are connected to the pulleys 40 and 46, respectively, by belts 54 and 56. The pulley 50 is a variable diameter pulley and the pulley 52 is a fixed diameter pulley. The belts 54 and 56 are of a predetermined constant length. The gear reducer 43 which mounts the pulley 40 and the motor M which mounts the pulley 46 are mounted on a supporting shelf 58 on the base and near the right-hand end thereof, as illustrated in FIGS. 1, 4 and 5, with the motor M situated between the gear reducer 43 and the right-hand end of the base and with the axes of the shafts 42 and 48 parallel and disposed transversely of the base. The gear reducer 43 is rigidly fastened to the shelf 58 by bolts 60—60. The motor M is fastened to the shelf by clamp blocks 62—62.

The intermediate pulleys 50 and 52 are supported at the right-hand end of the base on a horizontally disposed shaft 64 to which they are fixed so as to rotate in unison about the axis of the shaft 64, the latter being journaled in a bearing 66 mounted near the lower end of an arm 68, the upper end of which is pivotally connected by a pin 70 to a stud 72 screwed into a block 74 fastened to the base. The axis of the shaft 64 is parallel to the axes of the shafts 42 and 48 and the pulleys 50 and 52 supported by the shaft 64 are aligned, respectively, with pulleys 40 and 46 (FIG. 6) so as to receive the belts 54 and 56. The arm 68 which supports pulleys 50 and 52 is angularly movable about the axis of the pivot pin 70 and such angular movement effects translational movement of the pulleys 50 and 52 relative to the pulleys 40 and 46 in a direction to the left to effect an increase in the driving diameters of the pulleys 46 and 50 and to the right to decrease the effective driving diameters of the pulleys 46 and 50. Angular movement of the intermediate pulleys 50 and 52 is provided for by a piston and cylinder assembly 65 comprising a cylinder 67 fastened to the shelf 58 within which there is a piston 69. A rod 71 fastened to the piston extends from the cylinder and is connected at its distal end by a ball joint 73 to an extension 75 of the arm 68 beyond the bearing 66. Pressure supplied to the left end of the cylinder 67 extends the rod 71 to the right (FIG. 4) which places the speed change means in its low speed position.

The variable diameter pulleys 45, 50 of the speed change means each comprise two side parts which are pressed toward each other by springs 46s and 50s mounted in housings 46h and 50h (FIG. 6). The pressure exerted by the springs on the two sides of the pulleys determines the traction of the belts and also provides the power to move the arm 68 to the left into the high speed position, pushing the air out of the cylinder 67 through an exhaust port provided for this purpose. In order to cause the speed change means to transfer from high to low speed the air pressure supplied to the cylinder 67 must be greater than the spring pressure in each of the pulleys. It is necessary that the labeler be kept running during transfer from high speed to low speed and vice versa in order for the belts to climb up or down on the tapering surfaces of the pulleys. If, for example, the labeler is not running and is in the low speed position and the air pressure is not on, the belts will hang in limbo and when the labeler is started they will immediately start to slip or jump off the pulleys. To avoid this pressure is always maintained in the cylinder 67. If the main air supply to the labeler is turned off and to prevent the labeler from being started without pressure in the cylinder 67 it is desirable to provide an interlock which will make it impossible to turn on the labeler motor without first turning on the air supply.

Figure 8:
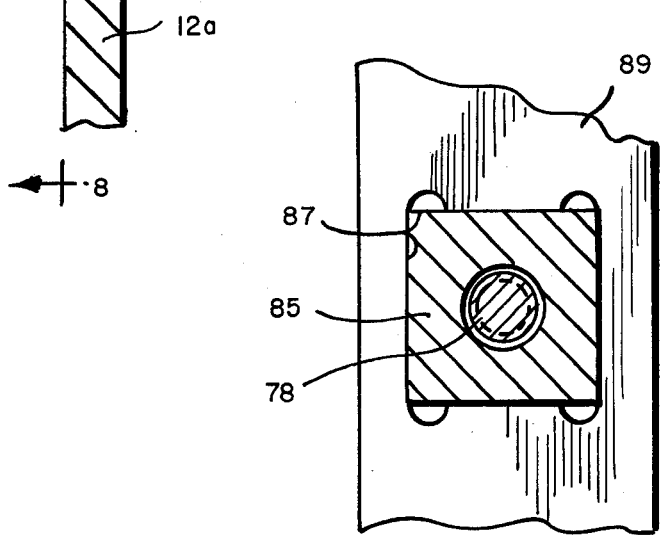
FIG. 8 is a section taken on the line 8—8 of FIG. 7.

At the low speed position of operation (FIG. 4) the speed is adjusted by two nuts 77—77 threaded onto the rod 71 at opposite sides of the extension 75. In this position the piston 69 bottoms at the end of the cylinder 67 and the desired low speed operation is obtained by adjustment of the nuts 77—77 along the rod. This low speed adjustment may be set a little higher than the minimum which is available according to the wishes of the customer; however, once it is made the labeler will always drop back to the same low speed. To insure bottoming of the piston at this end of the cylinder the end of the cylinder is provided with a vent opening 67a. At the high speed position (FIG. 5) the speed is adjusted by turning a hand wheel 84 at the end of a rod 78. The rod 78 (FIG. 8) extends through a ball joint 80 fixed in the arm 68 and is threaded into a nut 83 fixed into one end of the bar 85 of rectangular cross-section slidingly engaged within a rectangular opening 87 formed in a channel member 89 secured to the inner sides of the legs 12a—12a. Nuts 91—91 are threaded onto the rod 78 at opposite sides of the ball joint and determined the position of the rod relative to the arm. A pair of pins 93—93 are fixed to the bar which limit movement of the bar to the left by engagement with the channel member. Engagement of the pins with the channel member determines the maximum high speed position. At this position there must be a space 76b between the piston and the end of the cylinder to permit adjustment.

The labeler is normally operated at a speed such that the bottles are moved through it somewhat faster than they are delivered to it by the preceding machine which is usually the capper, otherwise they would back up to the capper. At a speed of 500 bottles per minute a gap will gradually develop in the line of bottles moving toward the feed screws and hence it is desirable to slow the labeler down to permit the bottles to catch up in the form of a solid line of bottles all the way to the feed screws. Additionally there is the danger that if a gap develops at high speed the bottle following the gap will not properly mesh with the spiral of the feed screws and will become jammed or break and so it is desirable to slow the labeler down to allow the bottle to find its way into the spiral of the screw without damage. It is also desirable to automatically slow the labeler down to a slow or idle speed when no bottles are being delivered to the labeler to economize in the operation and to maintain it at a low speed so that when bottles are again delivered to the labeler they will enter the feed screws without damage. For the foregoing reasons there is provided a control circuit, shown in FIG. 9, which is responsive to the detector 18 so as to cause the speed change means to make the change from low speed to high speed and vice versa at appropriate times. The circuit includes a switch arm 90 which is spring-biased by a spring 91 toward the path of movement of the bottles, a switch S-1 which is closed by outward displacement of the switch arm 90, an adjustable timer T, operation of which is initiated by closing of the switch S-1, contacts m,n which are closed by running out of the timer and a valve V which is closed by closing of the contacts m,n.

Since it is desirable to start the labeler with the speed change means in the low speed position, the valve V which is pressure operated is connected to a source of pressures which is kept on at all times so as to supply pressure to the cylinder 67 to hold the speed change means in its low speed position FIG. 4. This has the advantage of holding the belts taut while the labeler is not running so that when it is started they will not slip or jump off the pulleys as mentioned above.

When the labeler is started and bottles commence to pass the switch arm 90 of the detector they displace the switch arm outwardly thus closing the switch S-1 and this in turn initiates operation of the timer T. If there are no gaps in the line of bottles the time will run out and closes the contacts m,n which in turn energize a solenoid and the latter closes the valve V. Closing the valve V cuts off the supply of pressure to the cylinder 67 and at the same time vents air from the cylinder so that the pressure of the springs embodied in the pulleys move the speed change means from its low speed position FIG. 5 to its high speed position. The timer is set for 2 to 5 seconds depending upon the operation of the labeler so that the first bottle in a line of bottles being delivered at slow speed to the feed screws reaches the feed screws and becomes properly meshed with the spiral of the feed screws before the speed change means is moved to the high speed position. When gaps develop between the bottles in the line the switch arm 90 is moved in and out, opening and closing the switch S-1 so that the timer is repeatedly reset and never has a chance to run out and close the contacts m,n so that the solenoid remains unenergized and the valve V open thus holding the speed change means in the low speed position as long as there are gaps in the line of bottles.

It requires only one gap to cause the speed change means to move from high speed to low speed. Actually it takes from 2 to 5 seconds for the speed change means to move from low speed to high speed. Hence the timer is set so that it always insures that the drive will return to the low speed operation before it starts back up to the high speed operation even though there is just one gap in the line.

The rate at which the labeler changes from low speed to high speed is dependent upon the rate at which the air pressure is exhausted into the atmosphere from the solenoid valve V. A dump valve DV is provided for this purpose so that once the valve V is actuated to cut off the flow of pressure to the cylinder the air is exhausted through the larger opening provided by the dump valve. In making the change from low speed to high speed it is necessary to control the rate of dumping for if the piston 69 moves back faster than the belts will follow the taper on the pulleys 46 and 50 the belts will start slipping. To prevent this a flow control FC valve is provided which is adjustable to control the air flow to a rate that will keep the belts from slipping yet as fast as possible to change from low to high speed. The change for the full range usually requires about 2 seconds. It usually takes ¾ to 1½ seconds for the air in the cylinder 67 to exhaust to change from low to high speed. It is apparent from the foregoing that the air pressure supplied to the cylinder 67 controls the speed change from high speed to low speed and that the flow control valve FC controls the change from low speed to high speed. A minimum of 50 pounds is generally required to balance the air pressure in the cylinder 67 against the springs on the pulleys 46 and 50. If the pressure is 45 or 50 pounds the change is very slow. If the pressure is increased to 55 to 60 pounds it becomes faster and if the pressure is 65 to 70 pounds the change is very fast. A too fast change is detrimental to the belts because of the excess combination of sliding and rotating of the belts on the pulleys.

In operation of the apparatus so long as containers are continuously delivered to the conveyors so as to hold the arm 90 inoperative the labeler will operate at top speed. When the labeler is started or when a gap occurs the labeler is operated at a low or idle speed until the first bottle in the line reaches the feed screws, thus lessening liklihood of jamming and of breakage.

It should be understood that the present disclosure is for the purpose of illustration only and that this invention includes all modifications and equivalents which fall within the scope of the appended claims.

I claim:

1. Apparatus for processing containers comprising instrumentalities arranged along a predetermined path, means for moving containers along said path, a drive shaft and driving connections therefrom to the instrumentalities and the means for moving the containers along said path, speed change means connected to the drive shaft, and a detector arranged to detect the presence or absence of containers moving along said path and in response to an absence of containers to effect operation of said speed change means; characterized in that the speed change means comprised a variable diameter input pulley, a constant diameter output pulley fixed to the drive shaft, intermediate pulleys, rotation of which is imparted thereto by the input pulley and rotation of which imparts rotation to the output pulley, means supporting said intermediate pulleys for rotation in unison and movement relative to the input and output pulleys and comprising a constant diameter pulley and a variable diameter pulley and belts of predetermined fixed lengths drivably connecting respectively the input pulley to one of the intermediate pulleys and the output pulley to the other of the intermediate pulleys.

2. Apparatus according to claim 1, comprising means responsive to the detector to effect movement of the intermediate pulleys relative to the input and output pulleys to make the change from high speed to low speed and vice versa.

3. Apparatus according to claim 1, comprising a motor for moving the intermediate pulleys in one direction and spring means embodied in the variable diameter pulleys for moving them in the other direction, and means controlled by the detector for supplying power to the motor and for terminating the supply of power.

4. Apparatus according to claim 1, comprising a pneumatic motor for moving the intermediate pulleys in one direction, spring means embodied in the variable diameter pulleys for moving the intermediate pulleys in the other direction and means controlled by the detector for supplying air pressure to the motor and exhausting it therefrom.

5. Apparatus according to claim 1, comprising a control circuit embodying the detector and means in the control circuit for effecting an immediate change of speed of the speed change means from high speed to low speed and a delayed change of speed of the speed change means from low speed to high speed.

6. Apparatus according to claim 1, comprising a control circuit embodying the detector and means in the control circuit for causing an immediate change of speed from high speed to low speed for a single gap in the line of containers and for a delayed change of speed from the low speed to the high speed until the detector indicates that there is an unbroken line of containers all the way from the point of detection to the labeling instrumentalities.

7. Apparatus according to claim 1, comprising a control circuit embodying the detector, said control circuit comprising a first switch which is closed by the detector, a timer operation of which is initiated by closing of the first switch, a motor for effecting the speed change and a second switch operable by the timer when it runs out to initiate operation of the motor, said first switch if opened before the timer runs out preventing operation of the second switch.

8. Apparatus according to claim 4 comprising a valve connected to the pneumatic motor for supplying air pressure thereto, said valve being normally open, and a control circuit embodying the detector said control circuit comprising a switch which is opened and closed by the detector, a timer operation of which is initiated by the switch closing and a solenoid operable by timing out of the timer to close said valve.

9. Apparatus according to claim 8, wherein if the switch opens before the timer times out the solenoid will remain unenergized.

10. Apparatus according to claim 1, wherein the detector comprises an arm pivotally supported adjacent the path of movement of the containers and a spring biasing the arm toward the center line of the conveyor along which the containers travel, and wherein there is a control circuit embodying a switch connected to the arm which is opened and closed by oscillation of the arm, a timer connected to the switch operation of which is initiated by closing of the switch, a solenoid which is energized by timing out of the timer and which remains unenergized if the switch opens before the timer runs out and a normally open air valve which supplies pressure to the motor said air valve being connected to the solenoid and being closed by energization of the solenoid.

11. Apparatus according to claim 1, wherein a constant speed motor drives the input pulley.

12. Apparatus according to claim 1, comprising means supporting the intermediate pulleys for movement relative to the input and output pulleys and adjustable means for limiting the movement of the supporting means relative to the input and output pulleys.

13. Apparatus according to claim 12 wherein there is adjustable means for limiting the movement of the supporting means in each of the high speed and low speed positions independently of each other.

14. Apparatus according to claim 12, wherein the supporting means is an arm pivotally supported at one end for movement to and from the input and output pulleys about an axis parallel to the axes of the input and output pulleys, and there is means on the arm rotatably mounting the intermediate pulleys thereon for rotation about an axis parallel to the axes of the input and output pulleys.

15. Apparatus according to claim 14, wherein the intermediate pulleys are mounted intermediate the ends of the arm and there is means connected to the distal end of the arm for effecting angular movement thereof about its pivoted end.

16. Apparatus according to claim 15, wherein said last named means is a rod, means pivotally connecting one end of the rod to the distal end of the arm and means for adjusting said pivotal means along the rod to limit the movement of the arm in the low speed position.

17. Apparatus according to claim 14, wherein there is a rod pivotally supported on the arm intermediate its end, said rod being rotated about its longitudinal axis and a moveable stop threaded onto the rod for movement thereon relative to a fixed stop to limit the high speed position of the speed change means.

18. Apparatus for use in processing containers comprising instrumentalities arranged to operate on successive containers delivered to the apparatus, a drive motor for effecting operation of the instrumentalities and kinematic means drivably connecting the instrumentalities to the drive motor comprising spaced parallel shafts, a first variable diameter pulley fixed to one of the shafts, a first fixed diameter pulley fixed to another of the shafts, a second variable diameter pulley and a second fixed diameter pulley, means supporting the second variable diameter pulley and second fixed diameter pulley for rotation in unison about an axis parallel to the axes of the shafts with the first variable diameter pulley aligned with the second fixed diameter pulley and with the first fixed diameter pulley aligned with the second variable diameter pulley means for effecting movement of the second pulleys relative to the first pulleys, and belts entrained about the respective aligned pulleys.

19. Apparatus according to claim 18, comprising means for effecting movement of said means supporting the second pulleys to change the distance between the first and second pulleys.

20. Apparatus according to claim 18, comprising means for connecting the shaft to which the first variable diameter pulley is fixed to the drive motor.

21. Apparatus according to claim 18, wherein the second fixed diameter pulley transmits the rotation of the first variable diameter pulley to the first fixed diameter pulley.

22. Apparatus for use in processing containers comprising instrumentalities arranged to operate on successive containers delivered to the apparatus, a drive motor for effecting operation of the instrumentalities and kinematic means drivably connecting the instrumentalities to the drive motor, comprising spaced parallel shafts, a first variable diameter pulley fixed to one of the shafts, a first fixed diameter pulley fixed to another of the shafts, a second variable diameter pulley and a second fixed diameter pulley, an arm pivotally supported at one end for angular movement about an axis parallel to said shafts, means rotatably mounting the second pulleys on the arm for angular movement about said pivot relative to the first pulleys, said second pulleys being mounted on said arm with the second fixed diameter pulley aligned with the first variable diameter pulley and with the second variable diameter pulley aligned with the first fixed diameter pulley, belts of predetermined fixed length entrained about the aligned pulleys, a cylinder containing a piston, a rod connected at one end to the piston and at the other end to the arm, means for supplying pressure to one end of the cylinder to effect angular movement of the arm and spring means for effecting angular movement of the arm in the other direction.

23. Apparatus for use in processing containers comprising instrumentalities arranged to operate on successive containers delivered to the apparatus, a drive motor for effecting operation of the instrumentalities and kinematic means drivably connecting the instrumentalities to the drive motor comprising spaced parallel shafts, a first variable diameter pulley fixed to one of the shafts, a first fixed diameter pulley fixed to another of the shafts, a second variable diameter pulley and a second fixed diameter pulley, an arm pivotally supported at one end for angular movement about an axis parallel to said shafts, means rotatably mounting the second pulleys on the arm for angular movement about said pivot relative to the first pulleys, said second pulleys being mounted on said arm with the second fixed diameter pulley aligned with the first variable diameter pulley, and with the second variable diameter pulley aligned with the first fixed diameter pulley, belts of a predetermined fixed length entrained about the aligned pulleys, a cylinder containing a piston, a rod connected at one end to the piston and at the other end to the arm, means for supplying pressure to one end of the cylinder to effect angular movement of the arm, means for at times exhausting said one end of the cylinder and spring means for moving the arm in the opposite direction when the cylinder is exhausted.

24. Apparatus according to claim 23, wherein the spring means is embodied in the variable diameter pulleys.

25. Apparatus according to claim 23, wherein the end of the cylinder toward which the piston is moved by air pressure contains a vent to permit the piston to bottom at that end and wherein at the bottomed position of the piston the pivotally connected end of the arm is adjustable along the piston rod.

26. Apparatus for use in processing containers comprising instrumentalities arranged to operate on successive containers delivered to the apparatus, a drive motor for effecting operation of the instrumentalities and kinematic means drivably connecting the instrumentalities to the drive motor, comprising spaced parallel shafts, a first variable diameter pulley fixed to one of the shafts, a firxt fixed diameter pulley fixed to another of the shafts, a second variable diameter pulley and a second fixed diameter pulley, an arm pivotally supported at one end for angular movement about an axis parallel to said shafts, means rotatably mounting the second pulleys on the arm for angular movement about said pivot relative to the first pulleys, said second pulleys being mounted on said arm with the second fixed diameter pulley aligned with the first variable diameter pulley and with the second variable diameter pulley aligned with the first fixed diameter pulley, belts of a predetermined fixed length entrained about the aligned pulleys, a cylinder containing a piston, a rod connected at one end to the piston and at the other end to the arm, an inlet valve for supplying pressure to one end of the cylinder to move the piston therein toward the opposite end and simultaneously move the speed change means to the low speed position, means for at times shutting off the inlet valve and exhausting the cylinder through it and spring means operating when the cylinder is exhausted to move the speed change means to its high speed position.

27. Apparatus according to claim 26, wherein the inlet valve embodies an exhaust port and there is a dump valve connected thereto to exhaust the pressure from the cylinder as fast as possible.

28. Apparatus according to claim 27, wherein there is an adjustable control valve connected to the dump valve to control the escape of pressure from the cylinder.

29. Apparatus according to claim 23, wherein the second pulleys are mounted on the arm intermediate its ends, a ball joint adjustably connects the other end of the rod to the opposite end of the arm, adjustment of the ball joint along the rod determining the low speed position of the speed change means and adjustable means situated between the one end of the arm and the second pulleys for determining the high speed position of the speed means.

30. Apparatus according to claim 27, wherein the arm is moveable in a direction toward the input and output pulleys to increase the speed and away from the input and output pulleys to decrease the speed, comprising a ball joint on the arm, the ball of the joint containing a smooth hole, a shaft rotatably mounted in the hole with one end extending from each side of the arm, a bar mounted on the frame at that side of the arm toward which the arm is moved to increase the speed, for movement at right angles and parallel to the pivot axis of that arm, said shaft having a threaded end threaded into the bar such that rotation of the shaft effects longitudinal movement of the bar on the frame, pins on the bar situated between the frame and the arm for engagement with the frame, said pins determining the high speed position of the speed change means and a hand wheel on the other end of the shaft for effecting its rotation.

31. Apparatus according to claim 30, wherein there are nuts threaded onto the shaft at opposite sides of the ball joint for fixing the position of the shaft therein.

32. Apparatus for use in processing containers comprising instrumentalities arranged to operate on successive containers delivered thereto, a drive motor including a motor shaft, a gear reducer including an input shaft and an output shaft, the latter being connected to said instrumentalities, said motor and gear reducer being arranged with the motor shaft and input shaft parallel to each other, a first variable diameter pulley fixed to the motor shaft, a first fixed diameter pulley fixed to the input shaft of the gear reducer, a second fixed diameter pulley, a second variable diameter pulley, means mounting the second pulleys for rotation in alignment respectively with the variable diameter pulley and fixed diameter pulley and for movement in unison relative to said pulleys to change the distance between them, belts connecting the first pulleys and the second pulleys and means for effecting said relative movement.

33. Apparatus for use in processing containers comprising instrumentalities arranged to operate on successive containers delivered thereto, a drive motor and a drive shaft driven thereby, a gear reducer including an input shaft and an output shaft operably connected to said instrumentalities, said drive shaft of the motor being parallel to the input shaft of the gear reducer, a first variable diameter pulley fixed to said drive shaft, a first fixed diameter pulley fixed to the input shaft, a third shaft, a second variable diameter pulley and a second fixed diameter pulley fixed to the third shaft, means supporting the third shaft for rotation about an axis parallel to the axes of the drive shaft and input shaft and for movement relative to the drive shaft and input shaft to change the distance between the pulleys, means for effecting movement of the third shaft and belts of predetermined fixed length entrained about the respective pairs of pulleys comprising a first variable diameter pulley and second fixed diameter pulley and a second variable diameter pulley and a first fixed diameter pulley.

34. In a container processing machine, means for performing an operation on containers delivered to the machine, and means for effecting operation of said first means at a high speed when the containers are being delivered to the machine and at a lower speed when the containers are not being delivered to the machine, said last means comprising a first shaft connected to said first means, a drive motor and motor shaft driven thereby, a first variable diameter pulley fixed to said motor shaft, a first fixed diameter pulley fixed to said first shaft, a second fixed diameter pulley and second variable diameter pulley, means supporting the second pulleys in alignment with the first pulleys, belts of predetermined fixed length mounted on the pairs of pulleys comprising the first variable diameter pulley and the second fixed diameter pulley, and the second variable diameter pulley and the first fixed diameter pulley, and means for moving the support relative to the first pulleys.

* * * * *